Aug. 2, 1966 J. RABINOW 3,264,610

READING MACHINE WITH AUTOMATIC RECOGNITION OF CHARACTERS SUBSTITUTED FOR PRINT ERRORS

Filed Dec. 31, 1963 2 Sheets-Sheet 2

INVENTOR

Jacob Rabinow

BY Joseph A. Genovese & Max L. Libman

ATTORNEYS

INVENTOR
Jacob Rabinow
BY Joseph A. Genovese & Max L. Libman
ATTORNEYS 3,264,610

READING MACHINE WITH AUTOMATIC RECOGNITION OF CHARACTERS SUBSTITUTED FOR PRINT ERRORS

Jacob Rabinow, Bethesda, Md., assignor, by mesne assignments, to Control Data Corporation, Minneapolis, Minn., a corporation of Minnesota Filed Dec. 31, 1963, Ser. No. 334,747
8 Claims. (Cl. 340—146.3)

This invention relates to reading machines and more particularly to optical character reading machines.

At the present time there are satisfactory techniques for identifying printed characters. However, in applying these techniques to specific commercial, business, etc. reading assignments, a wide variety of difficult problems arise. Such problems (a few discussed below) stress the great distinction between identifying characters under ideal conditions and under usual business conditions to fulfill customer-needs as they exist.

A few of the difficulties are that characters are generally poorly printed; they are frequently out of register; and the contrast between characters and their background is not always reasonably constant. Another problem is "human error" in printing the characters (usually by typewriter), whether or not through the fault of the typist. My invention is concerned with this particular problem as discussed below.

There are many kinds of documents printed by typewriters, which are perfectly acceptable for machine-reading. Transportation waybills, pieces of mail, Government forms and returns, and many others, are either presently printed or can be printed by typewriters or other printers. Unfortunately, if a typist makes an error on a document, the error cannot be corrected by the typist in the usual way (by erasure and re-typing) unless the correction is most skillfully made. The reason is that most optical character reading machines are highly sensitive to changes in light reflectance, and smudges disturb the normal machine-operation. Furthermore, an erasure and insertion of a new character in place of the erased character often results in a misregistered character. For machine-reading it is, of course, sometimes possible to type an "error" code immediately after an erroneously typed character, and rely on a computer to care for the necessary correction. However, this presupposes the availability and use of a computer, and moreover this is not always a foolproof system. An erroneously printed character may not be noticed until after the entire line of print has been typed, in which case it is not possible to use an error code immediately following the erroneously printed character.

An object of my invention is to provide the facility in a reading machine for neglecting an erroneously printed character and inserting the proper, replacement character in a manner such that the output device (buffer, computer, printer, punch, etc.) is completely unaware of and uneffected by the substitution made by the reading machine.

An equally important object of my invention is to accomplish the preceding objective in a very simple and economical manner.

In the practice of my invention it can be assumed that the typewritten characters are printed in the usual way, i.e. in lines of print. Thus, the typist can be instructed to overprint an erroneously formed character by a special symbol or a dark imprinted grid, or "*x*," or any other character, in order to disfigure and thereby obfuscate (make obscure) the erroneously printed character. Then, directly above or below the overprinted character the correct, replacement character is typed. By providing typing instructions of this nature, a print error can be overprinted while the line of print is being typed or at any time after typing the line. Any number of characters of a line can be replaced in this way.

When a document is prepared with corrections in the above way, it may be read in a manner so that the main benefit of my invention is obtained, i.e. the correctly printed characters of the line are identified, and when an obfuscated character is reached the machine will neglect that character (not "reject" it which is different) and substitute the specially provided replacement character. Thereafter (without the machine stopping) the remaining characters of the line (if any) are identified by my machine. It is stressed that the sequence of character-identity signals at the machine output do not in any way indicate the presence of the obfuscated character. Instead the replacement character is substituted, and most important, in its proper place in the line.

It is indeed possible to practice my invention with all (of which I am aware) of the usual kinds of reading machines, e.g. stroke analysis, matrix machines, area comparison, feature selection, curve tracing, and others. It would obviously obscure my invention describing the many details of the various kinds of machines, and for this reason alone I have elected to describe my invention in connection with a retina reading machine, e.g. a simplified version of a machine like that described in Patent No. 3,201,751. In such machines the images of characters (e.g. of a printed line) are swept across a retina of photocells which extract information pertaining to each character and its background while the character images move (assume horizontal motion).

Using a machine such as this as the background for my invention, I sequentially bring one character area and one area above (or below) the character area into the field of view of the examination device (retina of photocells in a retinal machine). For example, motion of the images of character of the line (parallel to the line of print) can be caused by movement of the document, while the necessary transverse motion (to sequentially examine the character area and the area above or below—to see whether there is a replacement character present) can be caused by numerous means, e.g. an oscillating mirror, an image converter tube, etc. The transverse excursions of the image of each character are made somewhat in excess of twice the height of the character but can be larger, e.g. to look for a second or third correction (replacement character). Thus, not only is each character of the line examined, but also the adjacent area above and/or below the line is also examined. If there is an overprinted character in the line, the overprint character will come into the field of view of the examination device and immediately thereafter (or therebefore) the replacement character will be brought into the field of view. As described in more detail later, the reading machine has a choice between and will select the replacement character as the "true" character as against the overprinted or otherwise disfigured character.

In prior reading machines an operational difficulty is encountered when an intentionally overprinted character precedes or sucedes the true character. The overprinted character will be "rejected" by the machine as being incapable of identification, and the machine will provide a reject signal. Of itself, this may not seem to be a source of difficulty but in practical use, the format of the output is urgently important. A reading machine "reject" cannot be neglected nor ignored becase, in essence, a "reject" means that a character was presented to the reading machine and the reading machine could not identify that character. With my invention, this difficulty is overcome. The reason is that the overprinted character and the replacement character are presented to the reading machine which is required (by my invention) to select only the true character and neglect or ignore the overprinted character, i.e. without providing a "reject" or equivalent signal. Instead, the replacement character is substituted for the overprinted character. Thus, the order and sequence of characters identified by the machine will be correct.

Another object of my invention is to provide a reading machine having means for inserting print-correction, character-identifying signals in their proper place within a group of characters during a reading operation, thereby eliminating the necessity of subsequent editing and/or formating.

Other objects and features of importance will become apparent in the following description of the illustrated form of the invention which is given by way of example only:

Figures 3, 3A:
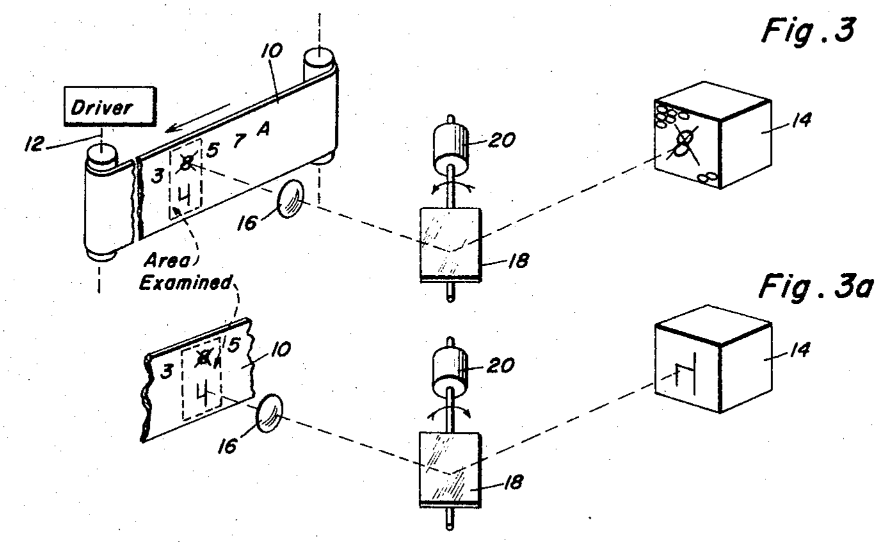
FIGURE 3 is a schematic fragmentary perspective view showing an optical system used in my reading machine.

FIGURE 3*a* is a view similar to FIGURE 3 but showing the optical system in another position.

Figure 4:
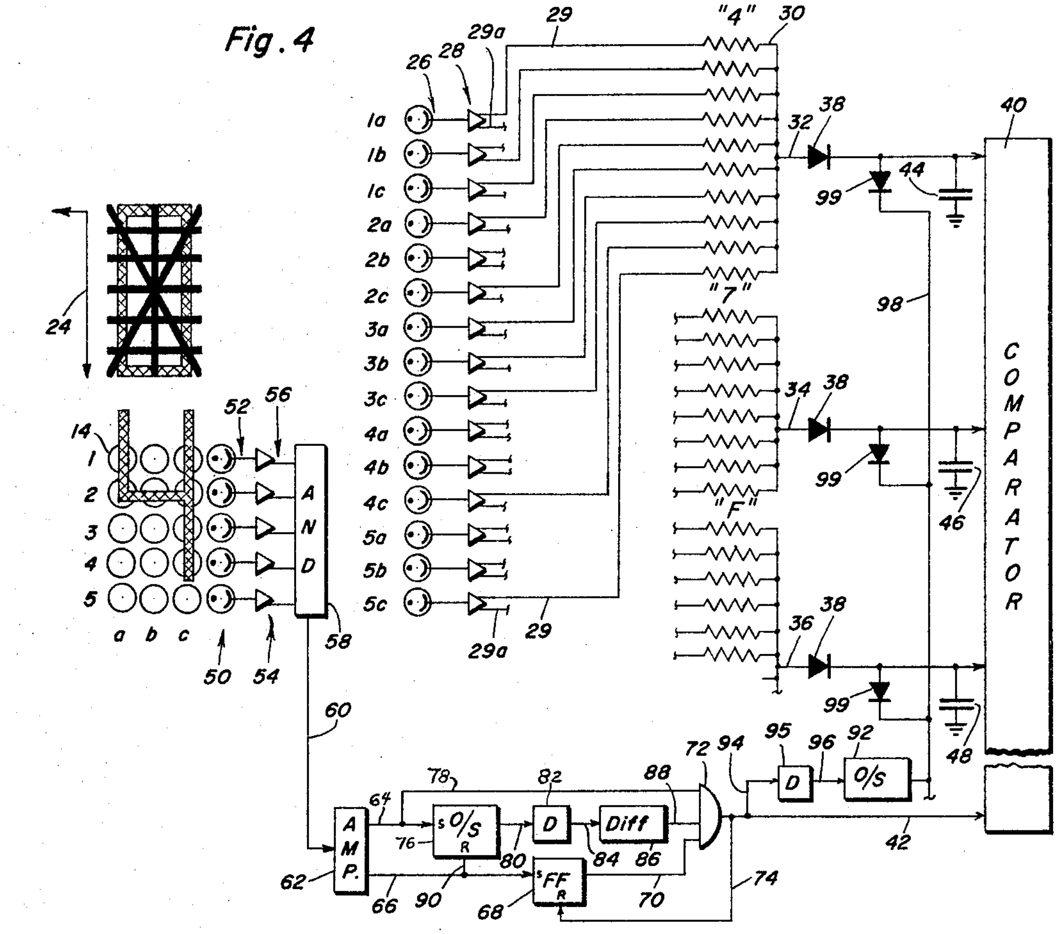

FIGURE 4 is a schematic view showing the circuit of my reading machine.

Figure 4A:
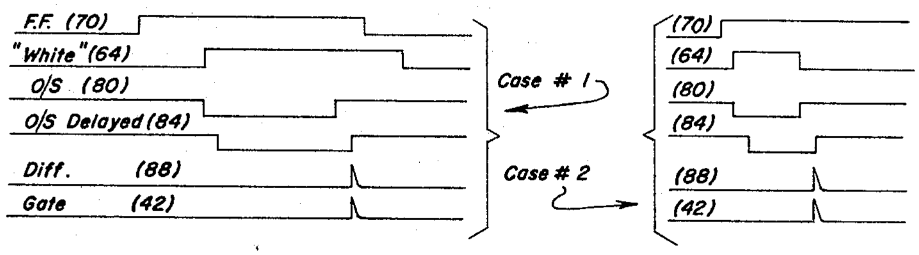

FIGURE 4*a* is a timing diagram to aid understanding of the control circuits of my machine.

PREFACE

Figure 1:
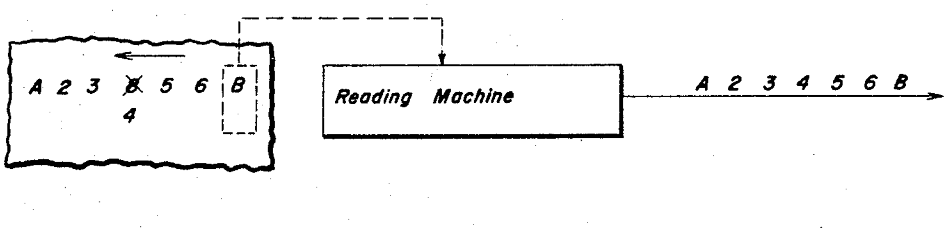
FIGURE 1 is a diagrammatic view showing the accomplishment of my invention.

FIGURE 1 shows the accomplishment of my invention. The line of characters on the document to the left of this figure is typical. As the images of the characters are moved in the direction of the arrow, the individual characters are examined and identified by the reading machine. Output signals corresponding to the identified characters are represented by characters to the right of FIGURE 1.

The fourth character in the line to the left of FIGURE 1 is assumed to have been printed erroneously. The erroneous character is overprinted or otherwise disfigured, and the "true" character "4" is typed as a replacement for the erroneous character, immediately therebelow. The output signals identifying the characters of the line, however, do not show the existence of the printing error. Instead, the true character "4" is located between the "3" and "5," i.e. it is in its proper place within the line of characters identified by the machine.

Figure 2:
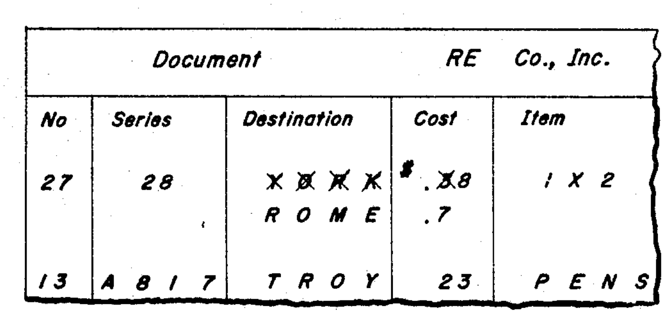
FIGURE 2 is an elevational view of a typical document printed in accordance with the typing instructions for inserting replacement characters for print errors.

FIGURE 2 shows a typical document such as used in many business transactions. I have illustrated two errors (amounting to five characters) which have been corrected by replacement characters adjacent to the overprinted or otherwise disfigured, erroneously printed characters. One error is in the destination. Instead of the destination being "York" the true destination is "Rome." The second error is in the cost. Instead of being 38¢, the item should be charged at 78¢.

My reading machine will examine the document of FIGURE 2 in the following way. As the document is moved horizontally, for instance from right to left, the characters under the "number" and "series" headings will be identified. When the first character is reached under the "destination" heading, the examination device of the reading machine will first examine the badly disfigured "Y" (by the overprint "X") of the word "York" and immediately thereafter the machine will experience the correctly formed "R" of the word "Rome." By means of control signals which are described later, and the design of my machine, the reading machine will make a decision between the disfigured character "Y" and the well-printed "R," and will ascertain which of the two either (a) fulfills a threshold number of requirements to be called a "true" character or (b) which of these characters best matches any one of character standards or criteria built in the machine. It is important to note that prior reading machines which are sequentially presented with a disfigured character and a well-printed character will sequentially provide a "reject" signal and a character-identity signal. This is very much different from my machine when presented with the same situation, e.g. the overprinted "Y" and the correctly printed "R" in the example under consideration. My machine, owing to control circuitry described later, will not identify the overprinted character at all and will correctly identify the "R." In a like manner all other character-corrections shown in FIGURE 2 will be cared for by my reading machine. FIGURE 2 shows the replacement "true" characters below the line of print, but it is obvious that they may be placed above the line of print with identical results. Further, I show provision for only one correction (by the typist) of a character. If desired a second (or more) correction of the same character can be made.

*Detailed description*

Attention is now directed to FIGURES 3, 3*a*, 4, and 4*a*. In these figures document 10 is shown being moved in one direction by means of the conventional document mover 12. An optical system forms an image of the characters in the line thereof on the face of an examination device 14 (described in detail later) which can, for example, be composed of a retina of photocells. The optical system includes lens 16, and an oscillating mirror 18 arranged in a manner to oscillate the character area and the area (at least equal in size to another character) directly therebelow (or thereabove) across the examination device 14 in a direction transverse to the motion of the character images caused by document-movement. In other words, the dotted line rectangle to the left of FIGURES 1, 3 and 3*a*, shows the area examined by examination device 14 owing to the oscillations of mirror 18.

Mirror 18 can be oscillated in any suitable manner, for example, as shown in the Rabinow Patent No. 2,933,246, or by a crystal (or other) driver 20 used as a part of a resonant system. For satisfactory resolution, the transverse movement of the character images (caused by oscillations of mirror 18) should be at least several times and preferably ten to thirty excursions as each character moves past the examining position.

Examination device 14 (FIGURE 4) is shown as a retina of photocells made of colums *a*, *b*, and *c* and rows 1–5 for simplicity of illustration. For most fonts, the retina will contain a larger number of photocells to obtain greater resolution. The images of the character "4" and the overprinted character "8" are shown at the left of FIGURE 4. The vector diagram 24 suggests a high rate of oscillatory movement of the character images with respect to the document translation of the images.

To aid explanation, the photocells of the retina are shown at the center of FIGURE 4 in a vertical row. It is understood that in practice, the photocells are arranged as a retina, e.g. as shown in the J. Rabinow Patent No. 3,201,751. The output lines 26 of the photocells are connected to individual amplifiers 28, each having two output wires 29 and **29*a* respectively for assertions and negations signals. These terms are explained in U.S. Patent No. 3,104,369. Briefly, when a photocell experiences the character image (dark) the upper wire of its associated amplifier provides a first signal, e.g. +6 volts, and at the same time the lower wire of the same amplifier provides the complement which will be in this case —6 volts, if it is assumed that the reference is 0 volts. Any other voltages can be selected. The assertion and negation signals for each examined character are conducted on lines 29, 29*a*** to correlation devices as described below.

The character standards or criteria may be constructed as resistor adders which form correlation devices, there being one such device for each character that the machine is expected to identify. The resistor adder 30 for the character "4" is correctly connected in FIGURE 4, i.e. assertion resistors (character-image seeking) are connected at points 1*a*, 1*c*, 2*a*, 2*c*, 3*a*, 3*b*, 3*c*, 4*c*, and 5*c*. The negation resistor of correlation device 30 is connected at point 1*b* of the matrix. This particular negation point is selected to distinguish between the characters "9" and "4." Accordingly, maximum signal occurs on the resistor adder output line 32 when all of the photocells associated with the assertion points experience the character image, i.e. "darkness," and the photocell associated with the negation point experiences the bright background of the character. In a like manner resistor adders are constructed for all other characters which the machine is expected to identify. I have fragmentarily shown adders for the numeral "7" and the letter "F" together with their output lines 34 and 36.

As the character images shown to the left of FIGURE 4 execute their motions (see FIGURES 3 and 3*a*), the signals on the correlation device output lines 32, 34, 36 (and the others, not shown) will rise and fall depending upon the degree of match between the image of unknown character and the character standards (i.e. the resistor adders, as designed for the particular characters that the machine is capable of identifying). The signals on lines 32, 34 and 36 are conducted through diodes 38 to comparator 40 which does not function until triggered by a signal on line 42 (as in U.S. Patent No. 3,104,369). Storage capacitors 44, 46 and 48 store the "best" correlation signal on the respective lines 32, 34 and 36. The "best" signal can be nearest to any reference, or highest positive, or most negative, etc. depending on circuit design.

As shown in FIGURES 3, 3*a* and the left of FIGURE 4, the characters move in one direction (shown horizontal) due to document motion, and their images are transversely swept across the examination device at a higher rate. During each excursion the correlation signals on lines 32, 34, etc. will rise and fall in accordance with the degree of match of the unknown character and the over-printed character (if any) with the character standards. The capacitors will "remember" (store) the highest correlation signals. However, since I provide one and only one "read" trigger signal for each examined area (shown in dotted lines in FIGURES 1, 3 and 3*a*) regardless of whether it contains one or more characters, only one character recognition signal for the true character is provided by comparator 40.

Attention is directed to the control circuit at the lower part of FIGURE 4. The purposes of the control circuit are to provide the necessary "read" trigger signal (on line 42), and to condition capacitors 44, 46, etc. for a subsequent character recognition cycle. Although the "read" signal can be obtained in many ways, my control circuit uses the following logic: When any cells of a column of photocells (e.g. column *c* or the special column 50, described later) detects a portion of a character (termed "black") followed by an all "white" (character background) condition of the entire column for at least one (and preferably more) full transverse excessions of the examination area, a "read" trigger signal is given. A logic circuit like this overcomes problems like false "read" signals at the beginning of a document (before the line of print is reached) and more than one "read" signal between characters. A description of the construction and operation of the control circuit follows.

Column 50 of photocells is at the leading edge (with respect to character image horizontal motion) of examination device 14. As indicated above, in the interest of economy, column *c* can be used in place of the extra column 50. The signals from the photocells of column 50 are conducted on lines 52 to amplifier 54 whose negation signal lines 56 are AND gated at 58. Thus, when all photocells of column 50 experience the background of a character ("white"), gate 58 provides a signal on its output line 60. Line 60 is connected to amplifier 62 having two output lines 64 and 66 which (like amplifier 28) conduct complementary signals (e.g. when column 50 detects "white" amplifier line 64 conducts a positive signal while line 66 conducts a negative "not white" signal). When any cell of column 50 experiences "black" the amplifier output signals on lines 64 and 66 exchange polarity i.e. the signal on line 64 becomes negative and the signal on line 66 becomes positive.

The first condition that must be fulfilled before the control circuit will provide a "read" trigger signal on line 42, is that column 50 must detect "black" which is equivalent to the presence of a positive "not white" signal on line 66 in view of the above explanation of amplifier 62. When such a signal occurs, flip flop 68 is set thereby providing a signal on its output line 70 which forms one entry of a three-input AND gate 72. Flip flop 68 is not reset until there is a "read" signal on line 42, which is the output line of AND gate 72. To reset the flip flop, feed back line 74 is connected to line 42.

The next requirement for a "read" trigger signal is that column 50 detect "white" for at least one full sweep of the entire area examined (i.e. the full height equal to two or more characters). The circuit is described below, and the operation is described later with reference to FIGURE 4*a*.

When there is a signal on line 60 (column 50 experiences "white"), line 66 of amplifier 62 conducts a negative signal which has no effect on flip flop 68 (all of my logic components respond only to positive signals). The now-positive signal on line 64 sets (turns on) one shot multivibrator 76 whose full duration is equal the time required for one (or more) transverse excursion of the full area to be examined over device 14. The positive "white" signal on line 64 is also used as a direct entry to gate 72 via line 78. The output of the one shot 76 is conducted by line 80 to a brief delay 82 (shorter than minimum "black" time). The delay output line 84 is connected to positive differentiator 86 (responds only to positive-going signals) whose output line 88 is the only remaining input to gate 72.

FIGURE 4*a* shows timing diagrams for two cases in the operation of the control circuit. Case #1 is where all of the necessary conditions are fulfilled and a "read" trigger signal is given. The wave forms of the signals are keyed to the lines which conduct them. First, flip flop 68 is set (by "not white" signal on line 66) providing the signal on line 70 (upper part of FIGURE 4*a*) forming one entry of gate 72. Then as the space between adjacent characters (or following the last character of a line) is detected by the cells of column 50, the signal on line 64 goes positive as shown in FIGURE 4*a*. This fires the one shot 76 whose output is negative and whose duration is selected as described before. The next wave form in FIGURE 4*a* shows the delay of the one shot output (delay greatly exaggerated in FIGURE 4*a*). The positive going portion of the one shot signal is differentiated, and, as shown, the differentiator output coincides at gate 72 with the signals on lines 78 and 70. Thus, the gate 72 provides a "read" trigger signal on line 42 for comparator 40.

Case #2 (FIGURE 4*a*) shows what happens when column 50 detects an all "white" condition which does not exist for the duration of one shot 76 (for example, each time that column 50 experiences a white character area below (and/or above) a character having no adjacent replacement character). The flip flop 68 is set and one shot 76 is fired as before. However, when the "not white" signal on line 66 goes positive before the end of the one shot signal, the one shot multivibrator is turned off by the positive signal on line 66 via line 90. At the same instant the "white" signal on line 64 goes negative, and owing to delay 82, the differentiator output (FIGURE 4*a*) fails to coincide with the "white" signal on line 78 at gate 72. Thus, no signal appears on line 42.

In the first case where there was a "read" trigger signal on line 42, comparator 40 will examine the charges on capacitors 44, 46, etc. and select the "best" as representing the true character. Shortly thereafter all of the capacitors are returned to ground or some other equal state, e.g. all capacitors are driven to a negative state, assuming the correlation signals on lines 32, 34, etc. to be positive. This can be done by using the "read" trigger to operate a one shot multivibrator 92 via lines 42, 94, delay 95 and line 96. The one shot output is conducted on bus 98 to the capacitors 44, 46, etc. through diodes 99, thereby discharging all capacitors (driving them from their various positive-charge conditions to ground or, more easily, to a predetermined negative charge).

It is understood that the embodiment of my invention shown in the drawing is given by way of example only. All variations and/or modifications within the scope of the claims may be resorted to without departing from the protection thereof.

I claim:

1. In a reading machine for characters formed in a line on a document, wherein a character printed erroneously is disfigured and replaced with a replacement character at a predetermined position with respect to the erroneously printed character, an examination device arranged to examine the area of both said disfigured character and said replacement character, said examination device including means to extract character-describing information from both of said areas and provide signals corresponding thereto, processing means responsive to said signals to provide a plurality of correlation signals whose values correspond to the correlation provided by both said disfigured character and said replacement character, a comparator, means to conduct said correlation signals to said comparator, and control means providing a control signal for said comparator so that the effect of comparator operation is that the comparator must make a decision between said replacement character and said disfigured character and provide a character-identity signal for the replacement character only.

2. In an optical character reading machine for characters on a document, wherein an erroneously printed character is disfigured and a replacement character is formed adjacent thereto, means to move the document in one direction, means for forming images of the characters, means to move said images in a direction transverse to said one direction and at a higher speed, a character area examination device over which the areas of said disfigured character and said replacement character images are swept, said examination device including photo-sensitive means providing signals corresponding to said areas, correlation means defining standards for the characters that the machine is capable of identifying, means to conduct said signals to said standards thereby enabling said correlation means to provide sequential correlation signals corresponding to the correlation between the replacement character and said standards and between the disfigured character and said standards, and decision means responsive to said correlation signals to identify one of the two characters to the exclusion of the other character.

3. In an optical character reading machine for a group of characters wherein one of the characters is disfigured and there is a replacement character in a predetermined position relative thereto, the improvement which enables the machine to substitute the replacement character for the disfigured character; said machine including photosensitive means to examine the character areas of said disfigured character and said replacement character and provide information signals corresponding thereto, character decision means to provide character-identity signals, and means providing a single control signal for said decision means in a manner such that said decision means is required to yield a single output on the basis of said information signals pertaining not only to said disfigured character but also to said replacement character.

4. In a reading machine for automatically substituting a replacement character-identity signal in its output instead of a signal corresponding to a disfigured character when an erroneously printed character is disfigured and the replacement character is located in a predetermined position relative to the disfigured character, said machine including photosensitive means for examining the area of said disfigured character and the area of said replacement character to provide information signals, means establishing character standards for the identity of the characters and to which said information signals are compared, decision means operatively associated with said standards establishing means, and means for requiring said decision means to provide only a single output as a result of examination of said disfigured character and said replacement character.

5. In a reading machine which automatically substitutes, in its output, a character-identity signal of a replacement character for a disfigured character when the replacement character is located in a predetermined position relative to the disfigured character, said reading machine including means to form images of the characters, an examination device providing information signals, means to move said images in a first direction, and means to move said images at a higher rate in a transverse direction in the field of view of said examination device, the excursions of said images in said transverse direction being of such length that said disfigured character and said replacement character come into the field of view of the examination device thereby making available information signals pertaining to both said disfigured and said replacement characters, means to process said information signals pertaining to both of said characters, and means connected with said processing means for providing only one character-identity signal as a result thereof.

6. The reading machine of claim 5 wherein said last-mentioned means include a comparator, and means to provide a single comparator trigger signal notwithstanding the examination of both of said characters.

7. The subject matter of claim 6 wherein said examination device includes a plurality of photocells, and said means to provide said single comparator trigger signal are responsive to output signals from at least a fraction of said photocells whose output signals signify the absence of a character at the position of said fraction during at least one transverse excursion of said images.

8. In a character reading machine for providing a character identity output signifying only one of two alpha-numeric characters presented to the machine, scanning means for scanning the areas of both of said characters and for providing signals which are related to the shape of each of said alpha-numeric characters, means forming character standards corresponding to the shapes of the alpha-numeric characters which the machine is expected to identify, means for conducting said signals to said standards, means providing further signals from said standards, said further signals corresponding to the correlation of said first-mentioned signals with said standards, decision means to provide said character identity output, and means for conducting said further signals from said standards to said decision means to enable said decision means to provide a single character identity output on the basis of said further signals which were provided as a result of the scanning of said two alpha-numeric characters.

References Cited by the Examiner

UNITED STATES PATENTS

| | | | |
|---|---|---|---|
| 2,944,734 | 7/1960 | Martin | 35—48 |
| 3,113,298 | 12/1963 | Poland et al. | 340—146.3 |

DARYL W. COOK, *Acting Primary Examiner.*

MALCOLM A. MORRISON, *Examiner.*

J. E. SMITH, *Assistant Examiner.*